2,871,167
Patented Jan. 27, 1959

2,871,167

CHLORTETRACYCLINE FERMENTATION

Stephen Aloysius Szumski, Pearl River, N. Y., assignor to American Cyanamid Company, New York, N. Y., a corporation of Maine No Drawing. Application December 12, 1956
Serial No. 627,756

5 Claims. (Cl. 195—114)

This invention relates to the production of chlortetracycline by fermentation and more particularly is concerned with an improved method of increasing the chlortetracycline ratio in the fermentative biosynthesis of chlortetracycline and tetracycline.

It has been known for some time that microorganisms of the species *Streptomyces aureofaciens,* which produce chlortetracycline in a medium containing chloride ion, also produce small quantities of tetracycline in the same medium. The concomitant production of tetracycline is objectionable when chlortetracycline is the principal product sought to be produced. Generally, while specification standards permit small quantities of tetracycline to be present in specification quality chlortetracycline, the presence of any sizable quantities of tetracycline is objectionable. Moreover, the presence of these two antibiotics in any sizable amounts in the fermentation mash involves difficult problems of separation in the refining or extraction procedures. It is possible, of course, to extract the antibiotics from the fermentation mash and by selective refining procedures to effect a separation of the antibiotics. However, the refining procedures for effecting separation of the antibiotics are not without some difficulty and they usually involve some loss in total antibiotic potency. Moreover, tetracycline, which in those instances where chlortetracycline is the principal product of the fermentation, may be considered a contaminant and is customarily discarded or allowed to degrade since it is usually not present in sufficient quantity generally to warrant the expense of a separate purification procedure to bring it up to specification standards and this, of course, also entails a loss in total antibiotic potency.

The present invention is based upon the discovery that by the addition of fluoride ion to the fermentation medium it is possible to alter the ratio of the two antibiotics produced in the fermentation greatly in favor of chlortetracycline so that only a relatively small amount of tetracycline is produced. So little, in fact, that it becomes unnecessary to have to effect a separation of the tetracycline from the chlortetracycline.

Any convenient source of fluoride ion may be used as, for example, the alkali metal or alkaline earth metal salts, e. g. sodium fluoride, potassium fluoride, calcium fluoride, barium fluoride, etc. In particular, it has been found that the potassium fluoride dihydrate salt $KF \cdot 2H_2O$ gives excellent results although, as stated above, the particular salt used is of little consequence since it is the fluoride ion and not the alkali metal or alkaline earth metal which produces the desired result.

Other ions of the halogen family do not produce this desired effect. Iodide ion has no effect at all in altering the ratio of chlortetracycline-tetracycline, while, as is known, bromide ion actually represses the formation of chlortetracycline.

The fluoride ion may be present in amounts ranging from about 20 to about 200 milligrams of fluoride ion per liter of medium. Only very small quantities of fluoride ion are required since if used in excess the ion apparently exerts a toxic effect on the microorganism, and the total antibiotic potency.

The conditions of the fermentation are generally the same as for the presently known methods of producing chlortetracycline by fermentation. That is, the fermentation medium contains the usual nutrients and mineral substances. Suitable nutrient substances which may provide those necessary substances include starch, dextrose, cane sugar, glucose, molasses, soybean meal, peanut meal, yeast, meat extracts, peptone, ammonium sulfate, urea, corn steep liquor, distillers' solubles, fish meal and other conventional substances. The inorganic salts include such things as calcium carbonate, ammonium sulfate, ammonium chloride, and the various trace elements such as manganese, cobalt, zinc, copper, iron and the like. Generally, it is preferred to use a medium rich in chloride ion also as higher yields of chlortetracycline are thereby obtained.

The other general conditions of the fermentation, such as hydrogen ion concentration, temperature, time, rate of aeration, preparation of the inoculum, sterilization, inoculation and the like are conventional and may be similar to those for the production of chlortetracycline shown in U. S. patent to Duggar No. 2,482,055.

The present invention is not particularly concerned with any specific microorganisms except to the extent that it is concerned with those microorganisms that produce chlortetracycline by fermentative biosynthesis. Insofar as is presently known, all such microorganisms are of the genus Streptomyces. The species *S. aureofaciens,* which produces chlortetracycline in fermentation media in which chloride ion is present as well as numerous natural and induced mutants is, of course, preferably used. A number of other chlortetracycline-producing microorganisms and tetracycline-producing microorganisms have been mentioned in the patent literature as alleged distinct species of Streptomyces such as *S. viridifaciens, S. sayamaensis, S. feofaciens,* and still others. The published morphological data on these microorganisms is insufficient conclusively to determine whether or not they are new species or merely strains of *S. aureofaciens.* Regardless of this, however, the present invention is not predicated upon the selection of a particular species of microorganism, but as indicated above, is concerned with the use of fluoride ion to increase the ratio of chlortetracycline to tetracycline produced in the fermentation.

In this connection, it is, of course, preferred to use the so-called chloride-scavenging strains of the chlortetracycline-producing microorganism since these strains are avid users of chloride ions and hence result in the production of larger quantities of chlortetracycline.

The recovery of the chlortetracycline from the fermentation liquor is conventional and need not be described as numerous methods for recovering chlortetracycline from fermentation liquors have already been published.

In the examples which follow the yields of chlortetracycline and tetracycline are expressed as gammas per milliliter ($\gamma$/ml.).

The invention will be described in greater detail in conjunction with the following specific examples.

EXAMPLE 1

A chlortetracycline fermentation medium containing a large amount of chloride ion was made up as follows:

| | | |
|---|---|---|
| Starch | grams per liter | 55 |
| Corn steep liquor | do | 25 |
| $CaCO_3$ | do | 9 |
| $(NH_4)_2SO_4$ | do | 5 |
| $NH_4Cl$ | do | 1.5 |
| Cottonseed meal | do | 5 |
| $FeSO_4 \cdot 7H_2O$ | milligrams per liter | 60 |

MnSO$_4$.4H$_2$O _____do____ 50
ZnSO$_4$.7H$_2$O _____do____ 100
CoCl$_2$.6H$_2$O _____do____ 5

To this medium were added in separate runs varying amounts of potassium fluoride calculated as the dihydrate salt KF·2H$_2$O. The media were dispensed in appropriate amounts into flasks, sterilized, inoculated with a vegetative inoculum of *S. aureofaciens* (Strain S-77) and incubated at 26.5° C. on a rotary shaker for 96 hours. They were then assayed for their chlortetracycline and tetracycline contents. The results obtained are reported in the table below.

Table 1

| Percent KF·2H$_2$O | Fluoride Ion, Milligrams Per Liter of Medium | Chlortetracycline, γ/ml. | Tetracycline γ/ml. | Chlortetracycline-Tetracycline Ratio |
|---|---|---|---|---|
| 0 | --- | 5,000 | 580 | 8.6 to 1 |
| .015 | 60 | 4,300 | 335 | 12.8 to 1 |
| .02 | 80 | 3,900 | 265 | 14.7 to 1 |
| .025 | 100 | 4,500 | 295 | 15.2 to 1 |
| 0 | --- | 5,080 | 520 | 9.7 to 1 |
| .015 | 60 | 5,450 | 560 | 9.7 to 1 |
| .020 | 80 | 4,980 | 450 | 11.0 to 1 |
| .025 | 100 | 4,830 | 350 | 13.8 to 1 |
| 0 | 0 | 5,200 | 650 | 8.0 to 1 |
| .02 | 80 | 2,900 | 230 | 12.6 to 1 |
| .025 | 100 | 3,950 | 255 | 14.6 to 1 |
| 0 | --- | 4,600 | 550 | 8.3 to 1 |
| .013 | 52 | 4,200 | 400 | 15.0 to 1 |

EXAMPLE 2

The procedure of Example 1 was repeated except that an inoculum of *S. aureofaciens* Strain S-580 was used. The results obtained are reported in the table below.

Table 2

| Percent KF·2H$_2$O | Fluoride Ion, Milligrams Per Liter of Medium | Chlortetracycline, γ/ml. | Tetracycline γ/ml. | Chlortetracycline-Tetracycline Ratio |
|---|---|---|---|---|
| 0 | --- | 2,230 | 900 | 2.4 to 1 |
| .02 | 80 | 980 | 225 | 4.5 to 1 |
| .025 | 100 | 1,120 | 270 | 4.1 to 1 |

EXAMPLE 3

The procedure of Example 1 was repeated except that an inoculum of *S. aureofaciens* Strain S-730 was used. The results obtained are reported in the table below.

Table 3

| Percent KF·2H$_2$O | Fluoride Ion, Milligrams Per Liter of Medium | Chlortetracycline γ/ml. | Tetracycline γ/ml. | Chlortetracycline-Tetracycline Ratio |
|---|---|---|---|---|
| 0 | --- | 4,800 | 395 | 12.1 to 1 |
| .013 | 52 | 4,050 | 195 | 20.8 to 1 |

EXAMPLE 4

The procedure of the preceding example was followed except that sodium fluoride was used as the source of fluoride ion. Substantially the same results were obtained.

EXAMPLE 5

The procedure of Example 3 was followed except that calcium fluoride was used as the source of fluoride ion. Substantially the same results were obtained.

I claim:

1. The process of producing chlortetracycline by aerobic fermentation of an aqueous fermentation medium with a chlortetracycline-producing microorganism of the genus Streptomyces which comprises carrying out the fermentation in the presence of added fluoride ion so as to increase the ratio of chlortetracycline to tetracycline.

2. The process of producing chlortetracycline by aerobic fermentation of an aqueous fermentation medium with a chlortetracycline-producing microorganism of the genus Streptomyces which comprises carrying out the fermentation in the presence of from about 20 to 200 milligrams of fluoride ion per liter of medium so as to increase the ratio of chlortetracycline to tetracycline.

3. The process according to claim 2 in which potassium fluoride as the dihydrate salt is used.

4. The process of producing chlortetracycline by aerobic fermentation of a chloride-containing aqueous fermentation medium with a strain of *S. aureofaciens* which comprises carrying out the fermentation in the presence of from about 20 to about 200 milligrams of fluoride ion per liter of medium so as to increase the ratio of chlortetracycline to tetracycline.

5. The process according to claim 4 in which potassium fluoride as the dihydrate salt is used.

References Cited in the file of this patent

UNITED STATES PATENTS

| 482,418 | Effront | July 5, 1892 |
| 2,482,055 | Duggar | Sept. 13, 1949 |
| 2,609,329 | Niedercorn | Sept. 2, 1952 |

FOREIGN PATENTS

| 16,093 | Great Britain | of 1889 |